Figure 1:
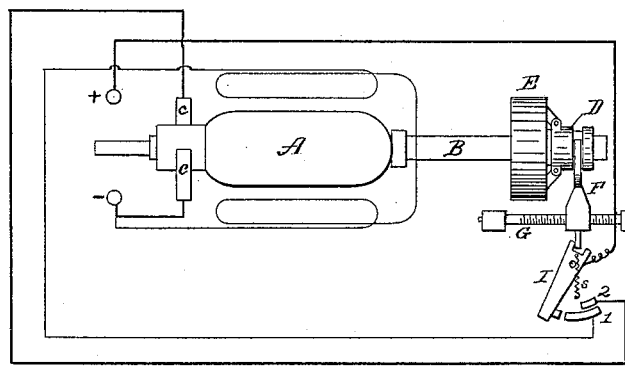

(No Model.)

F. A. PERRET.
ELECTRIC MOTOR STARTING AND STOPPING DEVICE.

No. 405,223. Patented June 11, 1889.

WITNESSES:
S. Field
J. L. Spaeth

Frank A. Perret, INVENTOR,
BY
McTighe & Worthington
ATTORNEYS.

UNITED STATES PATENT OFFICE.

FRANK A. PERRET, OF BROOKLYN, NEW YORK, ASSIGNOR TO THE ELEKTRON MANUFACTURING COMPANY, OF NEW YORK.

ELECTRIC MOTOR STARTING AND STOPPING DEVICE.

SPECIFICATION forming part of Letters Patent No. 405,223, dated June 11, 1889.

Application filed February 6, 1889. Serial No. 298,845. (No model.)

*To all whom it may concern:*

Be it known that I, FRANK A. PERRET, a citizen of the United States, residing at Brooklyn, in the county of Kings and State of New York, have invented certain new and useful Improvements in Electric Motor Starting and Stopping Devices; and I do hereby declare the following to be a full, clear, and exact description of the invention, such as will enable others skilled in the art to which it appertains to make and use the same.

This invention relates to starting and stopping devices for electric motors, and has for its object the prevention of injury to the motor at the time of introduction of current to the same, preparatory to setting it in normal operation in connection with its load; and the invention has for its further object means for automatically disconnecting the motor from its load in case the latter should become so heavy as to cut down the speed to an extent which might prove dangerous to the winding on the motor due to rise of temperature upon decrease of resistance coming from the reduction of speed.

The invention consists, briefly, in interposing a tight or loose pulley, friction-clutch, or other form of power-transmitting device between the motor-shaft and the work, or between the counter-shaft operated by the motor-shaft and the work, and arranging this in operative connection with an electrical switch, so that the motor can be connected with its work only by moving the belt-shifter, clutch, or other power-transmitting apparatus manually, and the moving device for such purpose will close in succession, first, the field-circuit of the motor, and, secondly, the armature-circuit; and it further consists in so arranging the devices that the clutch will not obtain its normal grip, or the belt be fully shifted to the tight pulley, until the closing of the armature-circuit has placed the latter in full and effective operation.

The invention further consists in arranging the belt-shifting or clutch-operating device and combined electrical switch in connection with an electro-magnetic detent or equivalent arrangement, such that upon the passage of an abnormal current through the motor-circuit the belt will be shifted to the loose pulley, or the clutch will be thrown out of engagement (as the case may be) automatically, and the circuits of the motor opened in the reverse order to which they had been closed.

The invention further consists in the arrangement and combination of devices, substantially as hereinafter fully described and claimed.

Figure 2:
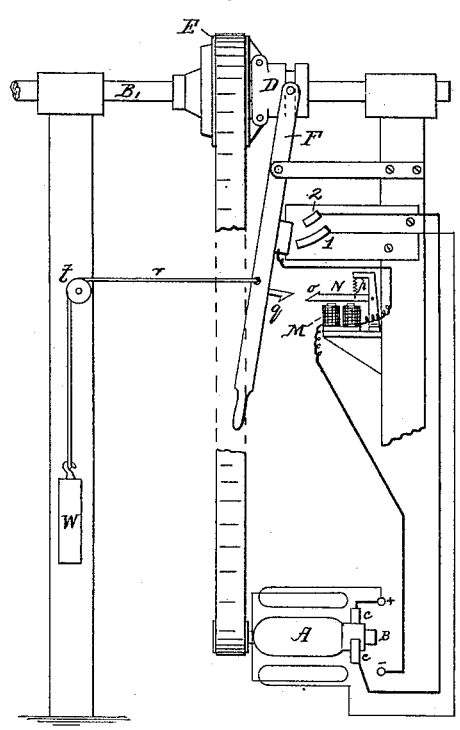
Figure 3:
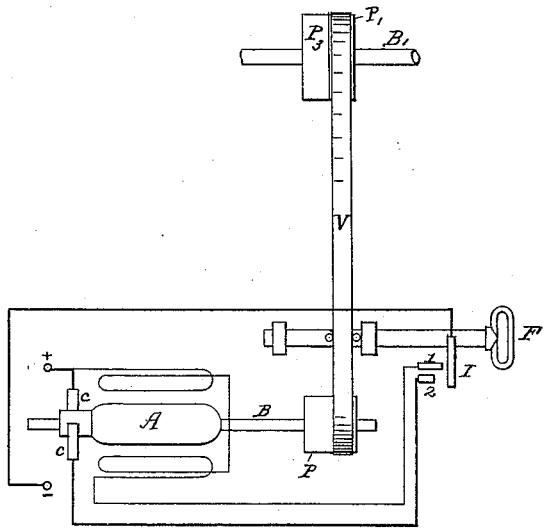

In the drawings which form part of this specification, Figure 1 is a diagrammatic view illustrating the direct application of my invention to the shaft of the motor, with special details to be described. Fig. 2 is an elevation showing the application of my invention to a counter-shaft operated by the motor, and also illustrating the automatic cut-out device and its circuit relations; and Fig. 3 is an elevation showing the operation with tight and loose pulleys.

In Fig. 1 the motor-armature A is mounted on the shaft B, with the brushes c placed, as usual, on the commutator of the motor. On shaft B, I mount a friction-clutch of any suitable design, which may be briefly described as follows: The hub D is permanently fixed to the shaft by means of a pin, key, or otherwise, so that it cannot revolve on the shaft, but is free to be moved longitudinally, and on it is also mounted the pulley E, which is arranged in the usual manner, so as to be clamped to the hub or free therefrom, according to the longitudinal position of the hub D on the shaft B. As shown in the figure, when the hub D is in its extreme position to the left, the pulley E is clamped rigidly to the shaft, and when the hub D is at its extreme position to the right the pulley E is free to revolve independently of the shaft B, or the latter is free to revolve independently of the pulley. This right and left movement of the hub D is effected by means of the shipper F, which is forked to engage a groove in the hub D, and at its lower end is threaded to fit the screw-shaft G, which is hung in suitable bearings and provided with a hand-crank H. The lower end of shipper F has an extension, which engages in the end of the switch-lever I, which is pivoted and preferably provided with a spring *s*, adapted to exert strain on the lever and throw it to the right or left as soon as it is past the dead-point. The switch-lever I is directly connected to one of the terminals of the motor, and is arranged to sweep across the two contact-blocks 1 and 2. Contact-block 1 forms one end of the field-magnet circuit of the shunt-wound motor, whose other end is connected directly to the remaining terminal of the motor. Contact-block 2 is connected to one of the brushes directly, and thence through the armature to the other brush, which is connected to the same terminal as the last-mentioned end of the field-magnet circuit. The position of all the parts in Fig. 2 is that of rest, the circuit being open.

When it is desired to start the motor, I turn the crank H in the required direction, so as to propel the hub D along the shaft B, and thus gradually bring the clutching devices into operative position, so as to connect the shaft B to the pulley E. During this motion the following steps take place: As the shipper F moves to the left the lower end of lever I is brought into contact with block 1, and thus the field-magnet circuit is closed and the maximum intensity of its lines of force attained before the current is admitted to the armature. Immediately following this operation the lever I is moved into contact also with block 2, which closes the armature-circuit, so that the current is not sent through the armature until the field-magnet has had time to build up its normal strength. As these operations proceed, it should be observed that the clutch has not yet effected a firm grip on the pulley E, and this requires a slight further turning of the crank H, and in the meantime the armature has plenty of opportunity to get up to substantially its maximum speed before the load is put upon it, and the latter finally exerts its strain on the armature in a gradual manner and after both armature and field have been made ready for the emergency. In this manner no possible damage can accrue to the commutator and brushes of the motor by reason of excessive sparking due to the inevitable conditions which obtain if a motor is started directly with the load attached, these conditions being that when the motor is at rest its resistance is very low and the full current will cause great sparking and consequent damage to the commutator and brushes, and also give rise to a tendency of the current to become short-circuited from coil to coil of the armature by burning out the insulation between them.

In Fig. 2 it will be seen that instead of directly applying my invention to the shaft of the motor I operate it on the counter-shaft B', which is to be driven by the motor. E is, as before, the clutch-pulley; D, the hub; F, the shipper, which in this case may be caused to take the place also of the switch-lever I. 1 and 2 are the contacts of the switch, and the circuits are the same as in Fig. 1, with the exception that between the shipper F and its connected terminal of the motor I interpose in that branch an electro-magnet M, in front of whose pole I pivot an armature N, having a detent o, as shown, the armature being retracted from the magnet by means of a suitable and preferably adjustable spring p. This electro-magnet device is located in a suitable manner, so that when the shipper F has been thrown to its position for the normal operation of the motor and counter-shaft, the detent o will engage the catch q, which is arranged on the shipper F, and hold the same fixed in that position until the armature N has been attracted by its magnet, whereupon the catch q is released. Connected to the shipper F is a cord r, passing over a pulley t, which may be located on one of the standards supporting the counter-shaft B', and below this attached to a suitable weight W, the relations being such that when the catch q has been released the weight W will be sufficient to instantly shift the shipper into the position of disengagement of the clutch with the pulley E. Under these conditions, after the motor has been set in normal operation, if the current should become from any cause excessive and liable to damage the motor, the tension to which the spring p has been adjusted will be overcome by the attraction of the electro-magnet M, the armature N will be attracted, and the shipper will be released, whereupon the weight W will not only throw the clutch out of engagement, but will also instantly open the two circuits of the motor, so that it will be impossible for any damage to occur to the motor from an excessive flow of current.

In some cases it may be desired to use simply a tight and loose pulley instead of the friction-clutch. Fig. 3 shows one form of arrangement which meets such a case. I show the application in its simplest form. On the shaft B of the motor-armature A, I place a tight pulley P, having a broad face. The power-shaft or counter-shaft B' above is fitted with a loose pulley P' and a tight pulley $P^3$, and a belt V passes over the pulley P and pulleys P' and $P^3$. A shipper F is arranged in any of the usual ways to shift the belt from pulley P' to $P^3$, and vice versa. Connected to the shipper F similarly to the arrangement shown in Fig. 1 is a switch-lever I, which sweeps over contacts 1 and 2, as before. The act of moving the shipper F causes the field and armature circuits to be closed before the belt is in full position on the tight pulley P, and the results are as before described.

I claim as my invention—

1. A device for starting and stopping electric motors, consisting of a movable lever or handle mechanically controlling the power-transmitting mechanism and electrically controlling the admission of current to the armature and field-magnet circuits of the motor, the arrangement being such that the movement of said lever or handle in one direction operates first to admit current to the field and armature circuits and then to gradually throw on the load, and its movement in the opposite direction operates first to throw off the load and then to open the said circuits.

2. The combination of an electric motor, a shaft or pulley driven thereby, and an interposed power-transmitting mechanism—such as a clutch or belt-shifter—adapted to mechanically connect said motor and transmitting mechanism into operative engagement, with an electric switch dependent upon the movement of said transmitting mechanism into or out of engagement and arranged to close the motor-circuits before complete engagement of the power-transmitting mechanism.

3. The combination of an electric motor, a shaft or pulley driven thereby, and a power-transmitting mechanism—such as a clutch or belt-shifter—adapted to mechanically connect said motor and transmitting mechanism into operative engagement, with an electric switch dependent upon the movement of said transmitting mechanism into or out of engagement and arranged to close first the field-circuit of the motor and then its armature-circuit before complete engagement of the power-transmitting mechanism.

4. The combination, with an electric motor and its power-transmitting mechanism—such as a shaft or pulley—of an interposed mechanical connection, means for operating said mechanical connection and for opening the motor-circuit, and an electro-magnet in the motor-circuit controlling the said mechanical connection and adapted for operation upon the passage of an abnormal current in the motor-circuit.

In testimony whereof I affix my signature in presence of two witnesses.

FRANK A. PERRET.

Witnesses:
JOSEPH BUCKLEY,
JOHN F. O'BRIEN.